United States Patent [19]
Akiyoshi et al.

[11] 4,100,496
[45] Jul. 11, 1978

[54] GHOST CANCELLATION DEVICE

[75] Inventors: Tsuyoshi Akiyoshi; Namio Yamaguchi; Keisuke Yamamoto, all of Ibaraki, Japan

[73] Assignee: Matsushita Electric Industrial Co., Ltd., Japan

[21] Appl. No.: 738,105

[22] Filed: Nov. 2, 1976

[30] Foreign Application Priority Data

Dec. 11, 1975 [JP] Japan .................. 50-136518

[51] Int. Cl.² .................. H04B 1/18; H04B 7/04
[52] U.S. Cl. .................. 325/369; 358/905
[58] Field of Search .................. 358/905; 325/366, 367, 325/369, 371; 343/701

[56] References Cited
U.S. PATENT DOCUMENTS

| | | | |
|---|---|---|---|
| 2,786,133 | 3/1957 | Dyke | 325/369 |
| 2,981,834 | 4/1961 | Holloway et al. | 325/369 |
| 3,478,269 | 11/1969 | Enemark et al. | 325/369 |

*Primary Examiner*—Robert L. Richardson
*Attorney, Agent, or Firm*—Burgess, Ryan and Wayne

[57] ABSTRACT

Disclosed is a device for eliminating the ghost wherein at least two antenna bays are spaced apart in the horizontal direction by ¼ wavelength, a mixer is provided which mixes the outputs from the antenna bays, phase shifting means for shifting the ghost signal in phase with or out of phase by 180° with the desired signal is inserted between the output terminal of one antenna bay and an input terminal of the mixer, amplitude control means is inserted between the output terminal of the other antenna bay and an input terminal of the mixer, and the output from the mixer is delayed and the delayed output and the undelayed output from the mixer are mixed so as to control their amplitudes and polarities, whereby the ghost signal may be cancelled.

3 Claims, 13 Drawing Figures

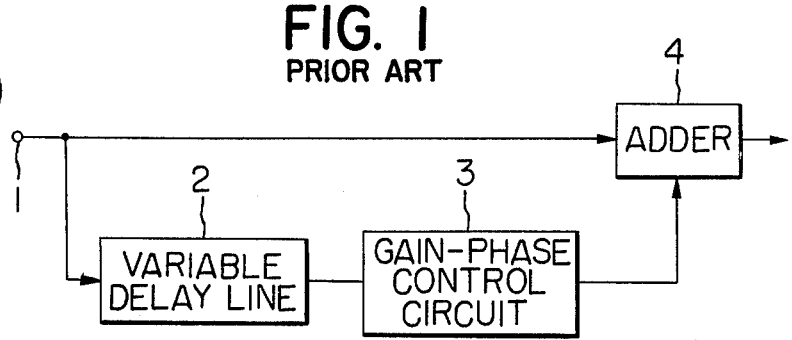
FIG. 1
PRIOR ART
(a)
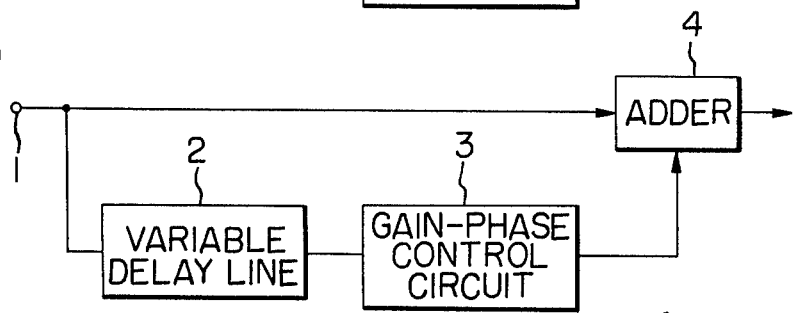
(b)
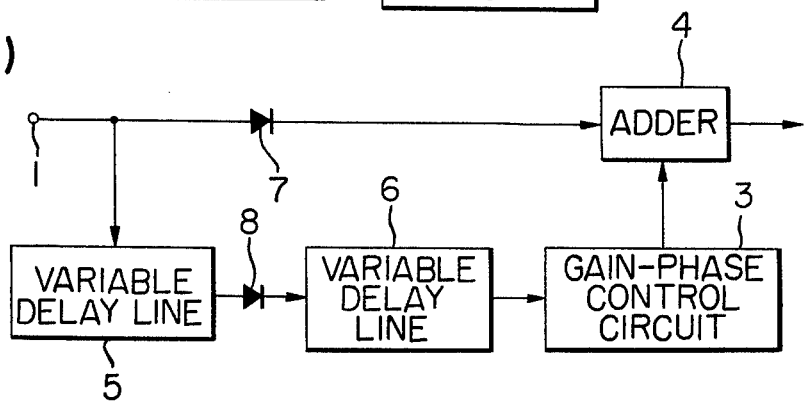
(c)
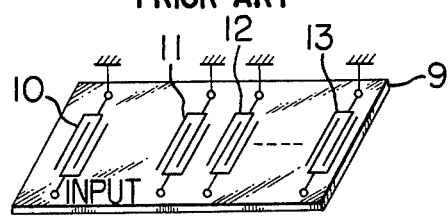
FIG. 2
PRIOR ART

FIG. 3
PRIOR ART
(a) 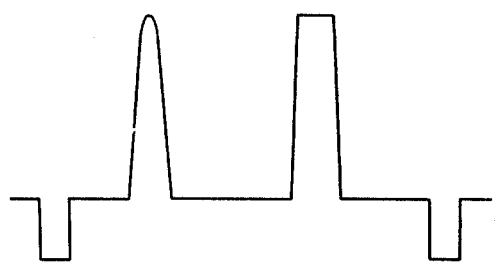
(b) 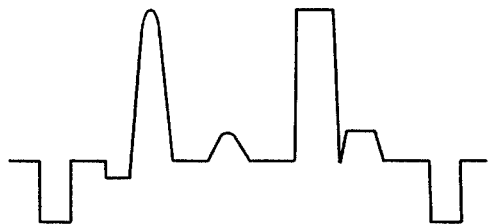
(c) 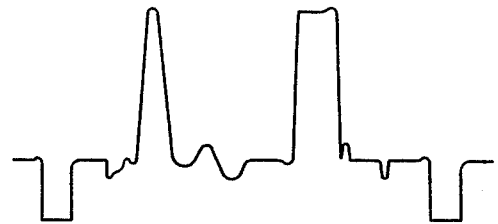

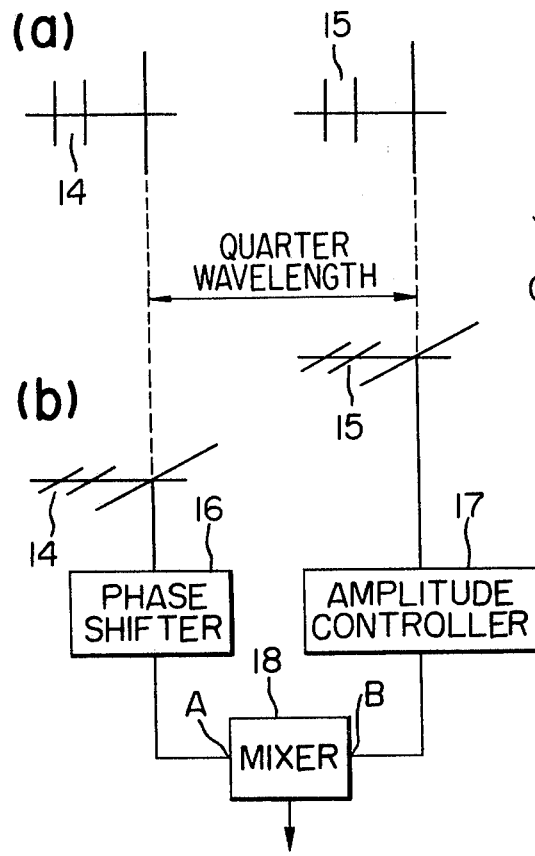
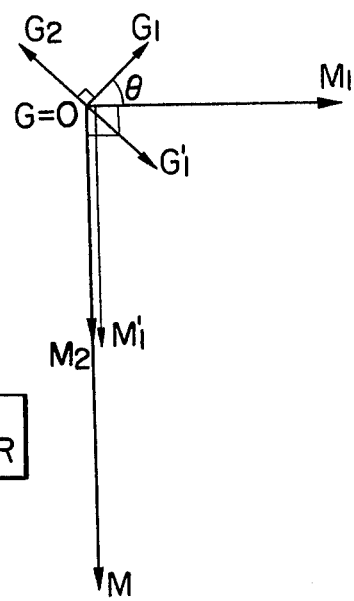
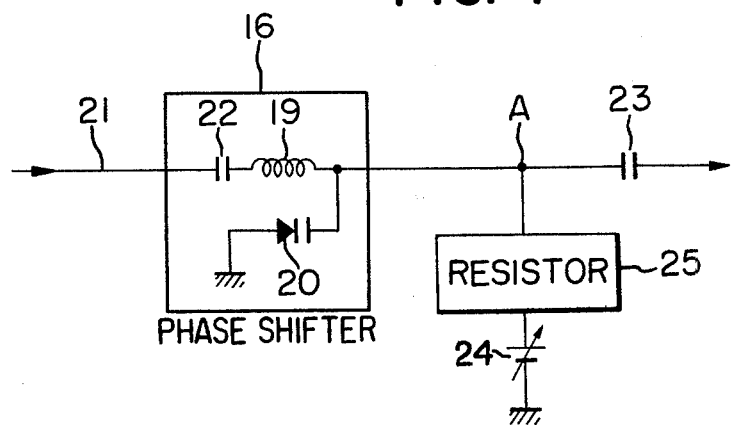

FIG. 6
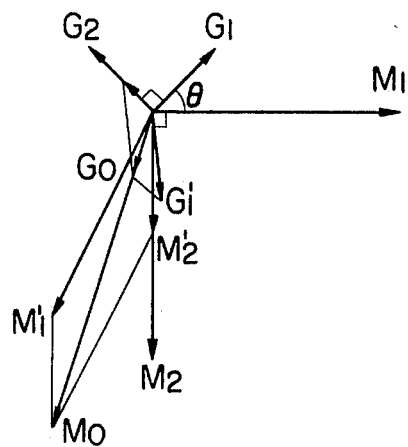
(a)
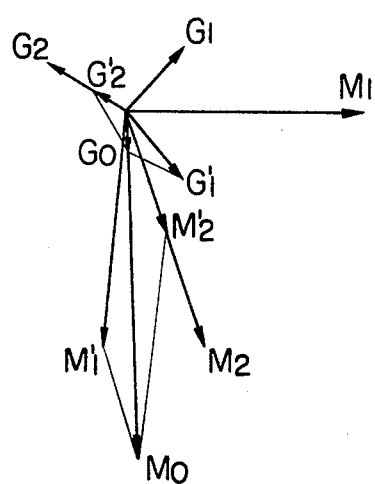
(b)
FIG. 8
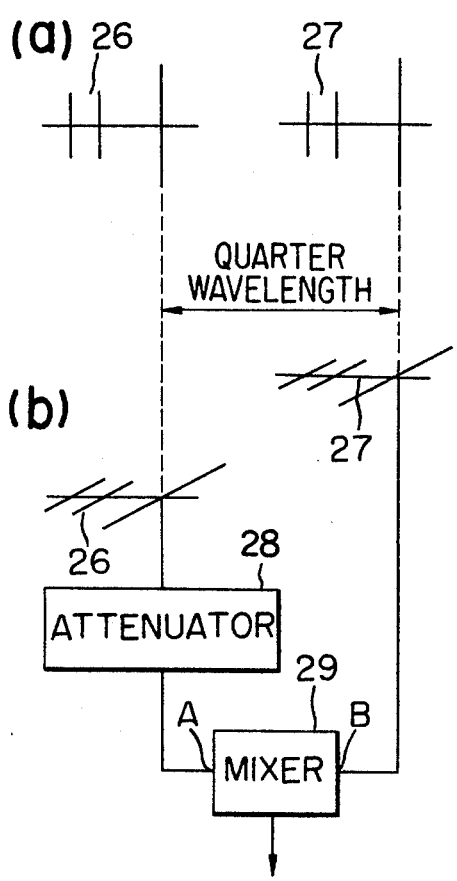

GHOST CANCELLATION DEVICE

BACKGROUND OF THE INVENTION

The present invention relates to a device for eliminating or cancelling the ghosts.

There has been deviced and demonstrated a method called "delay line cancellation" for cancelling the ghost in television receivers. According to this method, a ghost cancellation circuit consisting of a variable delay line, a circuit for controlling the gain and phase and an adder is inserted between a video intermediate-frequency amplifier stage and a detector stage. The output from the video intermediate-frequency amplifier stage is delayed through the variable delay line and the circuit for controlling the gain and phase of the output from the delay line, which make up a delay channel and is added to the output signal transmitted from the video intermediate-frequency amplifier stage to the adder through an undelayed channel, whereby the ghost signals are cancelled.

Another ghost cancellation circuit based on the delay line cancellation method is substantially similar in construction to that described above except that this circuit is inserted into a video signal stage succeeding the detector stage.

In a further example, two variable delay lines are inserted into delay channels before and after the detector stage, and the delayed and undelayed signals are added in the video signal stage.

The delay line cancellation method described above is based upon the theory that the desired signal which has been delayed in time with respect to the original desired signal and whose intensity or amplitude is varied with respect to the original desired signal is superposed upon the original desired signal so that the ghost is produced and the concept developed from this theory that the ghost signal may be cancelled in a television receiver if the desired signal is delayed by a time equal to the delay of the ghost signal, the amplitude or intensity of the desired signal thus delayed is made equal to that of the ghost signal and the thus delayed and amplitude or intensity controlled signal is subtracted from the desired signal. To design and construct a ghost cancellation circuit based upon the above theory and concept is sometimes easy and sometimes difficult depending upon what kind or type of a variable delay line is employed.

The conventional variable delay lines may be in general divided into the following three types:

(A) accoustic surface-wave delay lines;

(B) LC distribution or lumped parameter delay lines; and (C) semiconductor delay lines such as CCD and BBD.

For instance, an accoustic surface-wave delay line of type (A) consists of a substrate made of a single crystal of lithium noibate and straight input and output electrodes disposed on the surface of the substrate at right angles so that the time delay caused by the propagation of the signal by the surface-wave may be utilized. Therefore this type of delay line is only used in a IVF stage in a television receiver. Furthermore, the time delays are discrete; that is, the delay cannot be continuously varied because it is impossible to arrange input and output electrodes infinitely. As a result, the first mentioned ghost cancellation circuit is very unsatisfactory in practice.

In the second and third mentioned ghost cancellation circuits, the video signal is delayed so that the continuous delay may be possible. However, when the video signal is delayed too long, the frequency characteristic is adversely affected so that it becomes impossible to transmit better images. Therefore the second mentioned circuit is also unsatisfactory in practice.

In the third mentioned circuit, the output from the video intermediate-frequency amplifier stage is delayed by a substantial degree in the first delay line preceding to the detector stage, and then delayed again by a very small degree in the second delay line after the detector stage. Therefore this circuit is regarded most satisfactory at present. In the first mentioned circuit, the desired signal and the ghost signal are added before they pass through the detector stage so that the phase relation between the desired and ghost signals may be negligible. However, in the third mentioned circuit, the signal transmitted through the delay channel and the undelayed signal are added after the detector stage so that the high-frequency phase relation between them cannot be held negligible. If this relation is neglected, the effective ghost cancellation or elimination is impossible.

SUMMARY OF THE INVENTION

One of the objects of the present invention is therefore to provide a novel phost cancellation device consisting of an antenna circuit and a television receiver.

Briefly stated, the present invention provides a ghost cancellation device wherein at least two reception antenna bays are spaced apart in the horizontal direction from each other, a mixer for mixing the output from the antenna bays is provided, phase shifting means for shifting the ghost signal into in-phase or out-of-phase by 180°with the desired signal is inserted between the output terminal of one of the antenna bays and one input terminal of the mixer, amplitude or intensity control means is inserted between the output terminal of the other antenna bay and the other input terminal of the mixer, and the output from the mixer is delayed and the thus delayed output is mixed with the undelayed output from the mixer so as to control the amplitudes and polarities.

BRIEF DESCRIPTION OF THE DRAWINGS

FIGS. 1(*a*), (*b*) and (c) block diagrams of the prior art ghost cancellation circuits, respectively;

FIG. 2 is a schematic perspective view of a delay line used in the circuits shown in FIG. 1;

FIGS. 3(*a*), (*b*) and (*c*) show waveforms of the signals used for the explanation of the mode of operation of the circuits shown in FIG. 1;

FIGS. 4(*a*) and (*b*) are top view and block diagram, respectively, of an antenna section of a first embodiment of the present invention;

FIG. 5 and 6 are vector diagrams used for the explanation of the mode of operation of the antenna section shown in FIG. 4;

FIG. 7 is a circuit diagram of another section of the first embodiment;

FIGS. 8(*a*) and (*b*) are a top view and a block diagram, respectively, of an antenna section of a second embodiment of the present invention;

FIGS. 10(a) and (b) are top view and a block diagram, respectively, of an antenna section of a third embodiment of the present invention;

Figure 9:
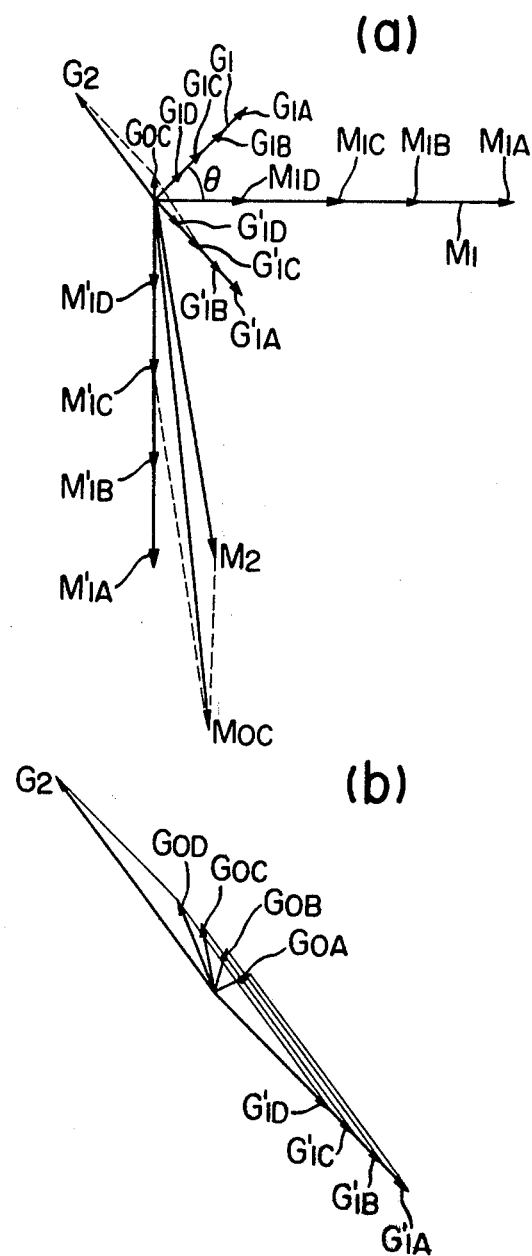
FIGS. 9(*a*) and (*b*) are vector diagrams used for the explanation of the mode of operation of the antenna section shown in FIG. 8.

DESCRIPTION OF THE PREFERRED EMBODIMENTS:

Prior Art, FIGS. 1,2 and 3

Prior to the description of the preferred embodiments of the present invention, the prior art ghost cancellation devices beased upon the delay-line cancellation methods will be described.

A ghost cancellation device shown in FIG. 1(a) is inserted between a video intermediate-frequency amplifier stage VIF and a detector stage of a television receiver. The VIF output is applied to a terminal 1, is passed through a variable delay line 2 and a gain-phase control circuit 3 where gain and phase are controlled and is added to the VIF output passed through an undelayed channel in an adder 4, whereby the ghost image may be canceled.

A ghost cancellation device shown in FIG. 1(b) is substantially similar in construction to the device shown in FIG. 1(a), but is inserted between the detector stage and a video signal stage.

In a ghost cancellation device shown in FIG. 1(c), two variable delay lines 5 and 6 are inserted before and after a detector 8 in a delay channel. A detector 7 is also inserted in the undelayed channel.

The underlying principle common to the above three ghost cancellation devices is based on the theory that the ghost is the result of addition of a desired signal, which is delayed in time and has certain amplitude, with the original signals so that the ghost may be cancelled by delaying the original signal a time equal to the delay of the ghost signal and making the amplitude of the original signal the same as that of the ghost signal and then subtracting the time-delayed and amplitude-controlled signal from the original desired signal containing the ghost signal. To design and construct ghost cancellation devices based upon the above underlying principle is sometimes easy and sometimes difficult depending upon the type of a delay line to be employed. The conventional variable delay lines may be divided into the following three types:

(A) Accoustic surface-wave delay lines;
(B) Lumped-parameter delay lines; and
(C) Semiconductor delay lines such as CCD and BBD.

An example of a delay line of type (A) consists of a base or substrate made of a single crystal of lithium niobate and straight input and output electrodes disposed on the surface of the base so that the delay in transmission of signal by the accoustic surface-wave may be utilized. In the television receivers, this type of delay line is only used in a VIF stage. Furthermore, the delay cannot be continuously varied because the number of input and output electrodes cannot be increased infinitely. Therefore, the ghost cancellation device shown in FIG. 1(a) is not satisfactory in practice. In the devices of the types shown in FIGS. 1(b) and (c) the video signal is delayed so that the continuous delay is possible. However, when the delay becomes longer, the frequency characteristic is adversely affected, resulting in the poor image transmission. Thus, the device shown in FIG. 1(b) is also unsatisfactory in practice. In the device shown in FIG. 1(c), a substantial delay is attained in an i-f stage by an accoustic surface-wave delay line and a fine delay adjustment is attained in a video stage. Therefore, this device is regarded as a most effective ghost cancellation system. However, this device has an inherent limitation in that the high-frequency phase relation between the desired signal and the ghost signal is neglected because this device is used in conjunction with the detector stage. In the device shown in FIG. 1(a), the delayed and undelayed signals are added before the detector stage so that the phase relation may be negligible, but in the device shown in FIG. 1(c) the phase relation is a very serious problem.

In FIG. 2 there is shown an accoustic surface-wave type delay line which has been used in the conventional ghost cancelers. It comprises a substrate 9 made of $LiNbO_3$ single crystal and a pluraltiy of comb-shaped electrodes 10, 11, 12 and 13 which are deposited by vacuum evaporation. The delay is dependent upon the distance between the input and output electrodes so that it may be varied by tapping. The delay line of this type has an insertion loss so that an amplifier must be provided in order to compensate the insertion loss.

Next the phase relation between the desired image and the ghost will be described. It should be noted that the ghost due to the superposition at the antenna of the high-frequency waves modulated by the video signals or television signals is different from the ghost due to the superposition of the video signals with the same or reverse polarities. That is, the phase relation among the antenna inputs is at random, and it does not follow that the phase difference is always 0 or 180°. The desired wave and the reflected wave or ghost wave received by the antenna differ in phase by 0 to 360°.

If the phase difference is between 0 and 180° and the level ratio $D/U >> 1$, where D = level of desired wave and U = level of ghost wave, the ghost is similar to the ghost produced by the video signals, but under other conditions a ghost having a complex waveform is produced so that the ghost image on the screen varies in a very complex manner.

FIG. 3 shows the difference in ghost wave due to the difference in high-frequency phase relation between the desired wave and the ghost wave. At the antenna the ghost wave is superimposed on the desired or direct wave shown in FIG. 3(a), and the waveforms as shown in FIGS. 3(b) and (c) are obtained by the envelope detection. FIG. 3(b) shows the waveform when there is no phase difference between the desired wave D and the ghost wave U. The waveform of the ghost U and the waveform of the desired wave D have the same polarity so that the so-called positive ghost is produced. When the desired wave D and the ghost wave U are different in phase by 90° as shown in FIG. 3(c), the ghost waveform which in neither positive or negative is produced so that the ghost image on the screen is not similar to the desired image. As shown in FIG. 3(c), the ghost waveform is similar to that obtained by differentiating the desired wave so that the contour of the ghost image on the screen is in the form of a very fine line. The prevails when the phase difference between the desired wave and the ghost wave is 270° or thereabout. From the above explanation of the phase relation between the desired wave and the ghost wave, it will be understood that the ghost cannot be eliminated by the addition in the video stage based on the delay line cancellation method.

First Embodiment, FIGS. 4 through 7

As shown in FIG. 4, two receiving bays 14 and 15 of a stacked antenna array are spaced apart vertically by about a quarter wavelength, and a phase shifter 16 is inserted in the transmission line from the antenna 14 while an amplitude controller 17 is inserted in the transmission line from the antenna 15. The outputs from the phase shifter 16 and the amplitude controller 17 are combined in a mixer 18 and is applied to a television receiver. It will be understood that the phase shifter 16 may be inserted in the transmission line from the antenna 15 while the amplitude controller 17 is inserted in the transmission line from the antenna 14.

The mode of operation of the first embodiment will be described with reference to FIG. 5. Since the antennas 14 and 15 are spaced apart by a quarter wavelength, the vector $M_2$ of the desired signal received by the antenna 15 lags by 90° behind the vector $M_1$ of the desired signal received by the antenna 14. Even when the distance between the dipoles of the antennas 14 and 15 is spaced apart by a quarter wavelength of a certain channel, the phase shifter 16 controls in such a way that the difference in wavelength between the desired signals received by the antennas 14 and 15, respectively, may be a quarter wavelength of a selected channel.

The phase-angle difference between the vector $G_1$ of the ghost signal received by the antenna 14 and the vector $M_1$ of the desired signal is 0. The vector $G_2$ of the ghost signal received by the antenna 15 advances the vector $G_1$ by ¼ wavelength so that the phase angle difference between $G_1$ and $G_2$ is 90°. The phase difference between $M_1$ and $M_2$ is also 90°. So it has been assumed that the desired signal is coming from the front while the ghost signal, from the behind.

The vectors $M_1$ and $G_1$ are lagged by 90° by the phase shifter 16 to $M_1'$ and $G_1'$. The amplitudes or intensities of the vectors $G_1'$ and $G_2$ are made equal by the amplitude controller 17 so that when they are mixed, the ghost signal becomes zero. However, in practice, the ghost signal arrives from many directions and the television signal receiving conditions are different from one channel to another so that it is theoretically impossible to cancel the ghost signal completely. The ghost signals may be cancelled when $G_1'$ and $G_2$ are exactly equal in amplitude or intensity and are also exactly out of phase by 180°. With the phase shifter and amplitude controller, it is extremely difficult to adjust the difference in phase and gain between the two antenna bays, feeder cables and so on. Thus, the deviation in vector of the desired and ghost signals from one channel to another varies, so that general television viewers cannot afford such a ghost cancellation device only consisting of a phase shifter and an amplitude controller. Therefore the present invention provides a ghost cancellation device having the feature that two antenna bays are used not for cancelling the ghost signal but for shifting the ghost signal in-phase with the desired signal and then the in-phase ghost signal is cancelled by the addition in the video stage based on the delay line cancellation method as will be described in detail hereinafter with reference to FIG. 6(a).

Referring to FIG. 6(a), $M_1$ and $G_1$ are shifted in phase to $M_1'$ and $G_1'$ by the phase shifter 16, and $M_2$ and $G_2$ are controlled by the amplitude controller 17 to become $M_2'$ and $G_2'$. The resultant vectors are Go and Mo which are in phase. The intensity or magnitude of the ghost signal vector is considerably smaller than that of the desired signal. With a phase difference other than $\theta$, it is possible to generate the ghost signal in phase with the desired signal.

The direction of and space between the two antenna are fixed so that when the television channel is changed and/or when the ghost signals arrive at the antennas at an angle, the phase difference between $G_1$ and $G_2$ and between $M_1$ and $M_2$ is not 90°. However when the phase shifter and amplitude controller are suitably adjusted, the ghost signal in phase with the desired signal may be easily generated as shown in FIG. 6(b).

Next referring to FIG. 7, an electronic phase shifter which may be used as the phase shifter 16 will be described. It comprises a coil 19, a variable capacitor diode 20 (to be referred to as "a varactor" hereinafter in this specification) and a capacitor 22. The signal transmitted through a transmission line 21 passes through the capacitor 22 and coil 19, and the output is derived from the junction A between the coil 19 and the varactor 20 and is transmitted through a capacitor 23 to a television receiver. DC voltage from a DC power supply 24 is applied through a resistor 25 to the junction A. The phase shift may be varied by varying the DC voltage to vary the capacitance of the varactor 20.

Second Embodiment, FIGS. 8 and 9

Referring to FIG. 8, a stacked antenna consisting of antenna bays 26 and 27 is installed, as complied with its basic requirements, so that the dipoles are spaced apart from each other by ¼ wavelength. An attenuator 28 is inserted into the transmission line from the antenna 26 and the output from the attenuator 28 is mixed in a mixer 29 with the signal from the antenna 27. The output from the mixer 29 is transmitted to a television receiver. Alternatively, the attenuator 28 may be inserted into the transmission line from the antenna 27. The television receiver includes a delay line cancellation circuit based on the addition method in the video stage. The second embodiment has the feature that only the attenuator 28 which corresponds to the amplitude controller of the first embodiment is used.

Next referring to FIG. 9(a), the mode of operation will be described. As with the case of the first embodiment the vector $M_2$ of the desired signal received by the antenna 27 delays by 90° behind the vector $M_1$ of the desired signal received by the antenna 26, because the dipoles are spaced from each other by ¼ wavelength, but in practice the phase angle difference is not exactly 90° because of the change in atmospheric conditions, the difference in angle between the direct wave path a d the reflected wave path, the variation in properties and characteristics of feeders and so on.

The vecotr $G_1$ of the ghost signal received by the antenna 26 is out of phase by $\theta$ from the vector $M_1$ of the desired signal received by the same antenna 26. The vector $G_2$ of the ghost signal received by the antenna 27 is out of phase with the vector $G_1$ of the ghost signal received by the antenna 26 by the same degree with the phase angle difference between $M_1$ and $M_2$.

The vectors $M_1$ and $G_1$ are changed into $M_{1A}$, $M_{1B}$, $M_{1C}$ and $M_{1D}$ and $G_{1A}$, $G_{1B}$, $G_{1C}$ and $G_{1D}$, respectively, by the attenuator 28 inserted in the transmission line from the antenna 26, and they are shifted in phase by 90° in the mixer 29. For this purpose, it may be so arranged that the inputs to the mixer 29 at the input terminals A and B are out of phase by 90°. Alternatively, a fixed phase shifter may be connected in series to the attenuator 28. Vectors $M_{1A}$, $M_{1B}$, $M_{1C}$ and $M_{1D}$ and $G_{1A}$, $G_{1B}$, $G_{1C}$ and $G_{1D}$ are shifter in phase by 90° to $M'_{1A}$, $M'_{1B}$, $M'_{1C}$ and $M'_{1D}$ and $G'_{1A}$, $G'_{1B}$, $G'_{1C}$ and $G'_{1D}$, respectively. Resultant vectors are $G_{OA}$, $G_{OB}$, $G_{OC}$ and $G_{OD}$ as shown in FIG. 9(b). Thus, the resultant phase may be variable. The same is true for $M_1$ and $M_2$. Thus, the resultant vector of the ghost signals may be made in phase or out of phase by 180° with respect to the resultant vector of the desired signals only by the variable attenuator 28. FIG. 9(a) shows that the resultant vector $M_{OC}$ is out of phase by 180° with respect to the resultant vector $G_{OC}$. With this antenna array, the ghost signal may be cancelled because the delay line cancellation circuit in the video stage may cancel the ghost signal which is in phase or 180° out of phase with the desired signal.

Figures 10, 11, 12:
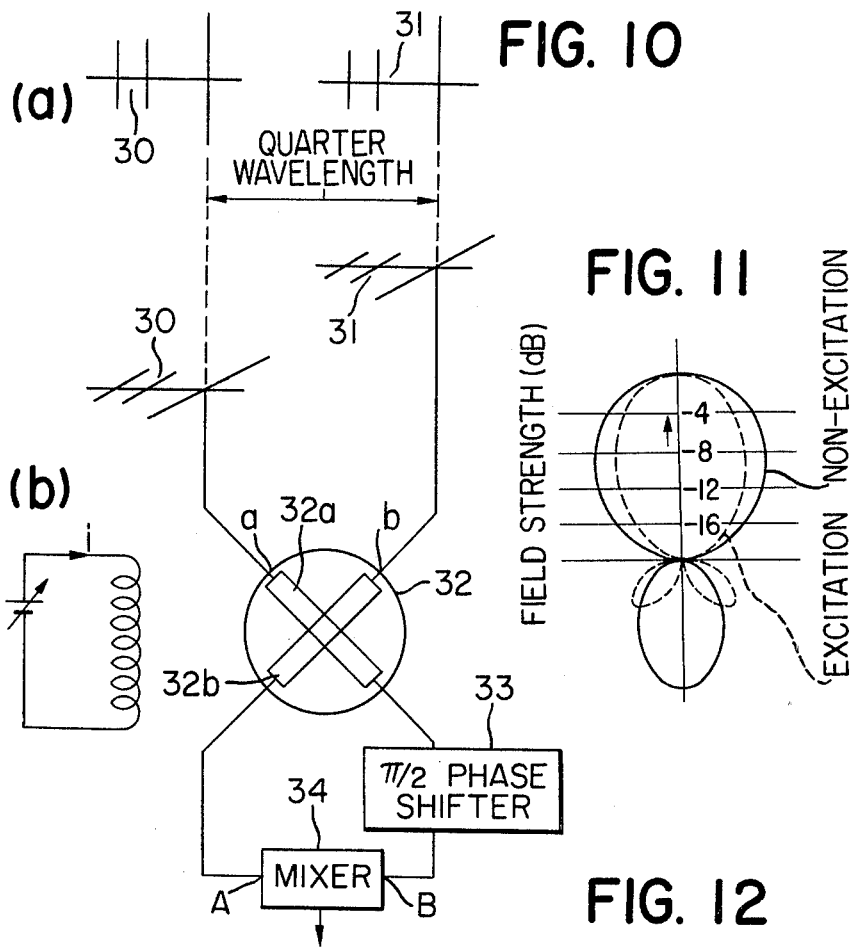
FIG. 11 shows a directivity pattern of the antenna section shown in FIG. 10.
FIG. 12 shows the characteristic curves of the antenna section shown in FIG. 10.

Third Embodiment, FIGS. 10 through 12

Referring to FIG. 10, a stacked antenna array consisting of two antenna bays 30 and 31 is installed in such a way that the distance between the dipoles is ¼ wavelength, and the outputs from the antennas 30 and 31 are applied to the terminals a and b, respectively, of a non-reversible element or ferrite phase shifter 32. The element 32 comprises a disk-shaped ferrite of a $G_{a-r}$ system and strip lines 32a and 32b disposed at right angles on the disk. DC current is applied to the element 32 to magnetize it in the axial direction. One output from the strip 32a is applied through a $\pi/2$ phase shifter 33 to the terminal B of a mixer 34, while the output from the strip 32b is directly applied to the terminal A of the mixer 34. The output from the mixer 34 is applied to the television receiver including a delay line and canceller for cancelling the ghost signal. If the non-reversible element 32 is eliminated from the third embodiment, the third embodiment is substantially similar to the first embodiment shown in FIG. 1 and is effective in cancelling the ghost signals arriving at the antennas just from their rear. Fundamentally, the third embodiment shown in FIG. 10 is a phase feed antenna employing a well-known non-reversible element, but it should be noted that in the prior art antenna the non-reversible element 32 is used to provide a high impedance to the ghost signal coming from the rear of the antenna and to provide a low impedance to the desired signal coming from the front of the antenna, thereby minimizing the ghost signal. The strip lines 32a and 32b are perpendicular to each other and the signals applied to the terminals a and b are out of phase by 90° because the antennas 30 and 31 are spaced apart by ¼ wavelength so that the rotating fields are generated on the surface of the disk-shaped ferrite 32. The direction of the rotating field produced by the desired signals is opposite to the direction of the rotating field generated by the ghost signals. The ferrite which is used as the non-reversible element 32 exhibits a high impedance to one direction due to the DC field and a low impedance in the opposite direction. Therefore the stacked antenna exhibits the directivity pattern as shown in FIG. 11. The above characteristic of the non-reversible element 32 has been utilized in the prior art ghost cancellation systems, but so far no satisfactory result has been attained because of the difference in angle between the desired and ghost signals, the difference in properties and characteristics of feeders and cables, the difference in frequency between the channels and so on. However, in the third embodiment the novel feature of the non-reversible element 32 combined with the stacked antenna is combined with the feature of the delay line cancellation system for minimizing the ghost signal and generating the ghost signal in phase with the desired signal.

FIG. 12 shows the relation between the input-output characteristics of one of the strip lines 32a and 32b and the exciting current. With a constant input, the maximum output is obtained when the exciting current is 125 mA, but the greater phase difference results. This is very similar to the resonance characteristic. When the geometrical dimensions (such as width, length and so on) of the strip lines 32a and 32b are made different from each other, the exciting current at which the output reaches the peak varies. Therefore when the outputs from the element 32 are mixed in the mixer 34 as shown in FIG. 10, the output from the mixer 34 is substantially similar to that derived from a system in which a variable attenuator and a variable phase shifter are inserted in each of the transmission lines from the antenna bays. Therefore, as in the case of the first embodiment shown in FIG. 1, the attenuation and phase shift are controlled only by varying the exciting current so that not only may the ghost signal be minimized in intensity but it is also possible to generate a ghost signal in phase with the desired signal. Therefore, in addition to the features of the first embodiment shown in FIG. 4 the third embodiment has the features that the front-to-back ratio may be considerably improved and that the ghost signal in phase with the desired signal may be produced only by varying the exciting current. Furthermore, the third embodiment is very easy to operate.

In the first, second and third embodiments described above, it is not necessary to employ stacked antennas. The same features may be obtained only by spacing the dipoles by about ¼ wavelength in the vertical direction. When the stacked antenna is used, it is not necessary to direct the antenna bays in the same direction. That is, one antenna bay may be directed toward the television station whereas the other antenna bay may be directed in the direction in which the reflected or ghost wave comes.

Figure 13:
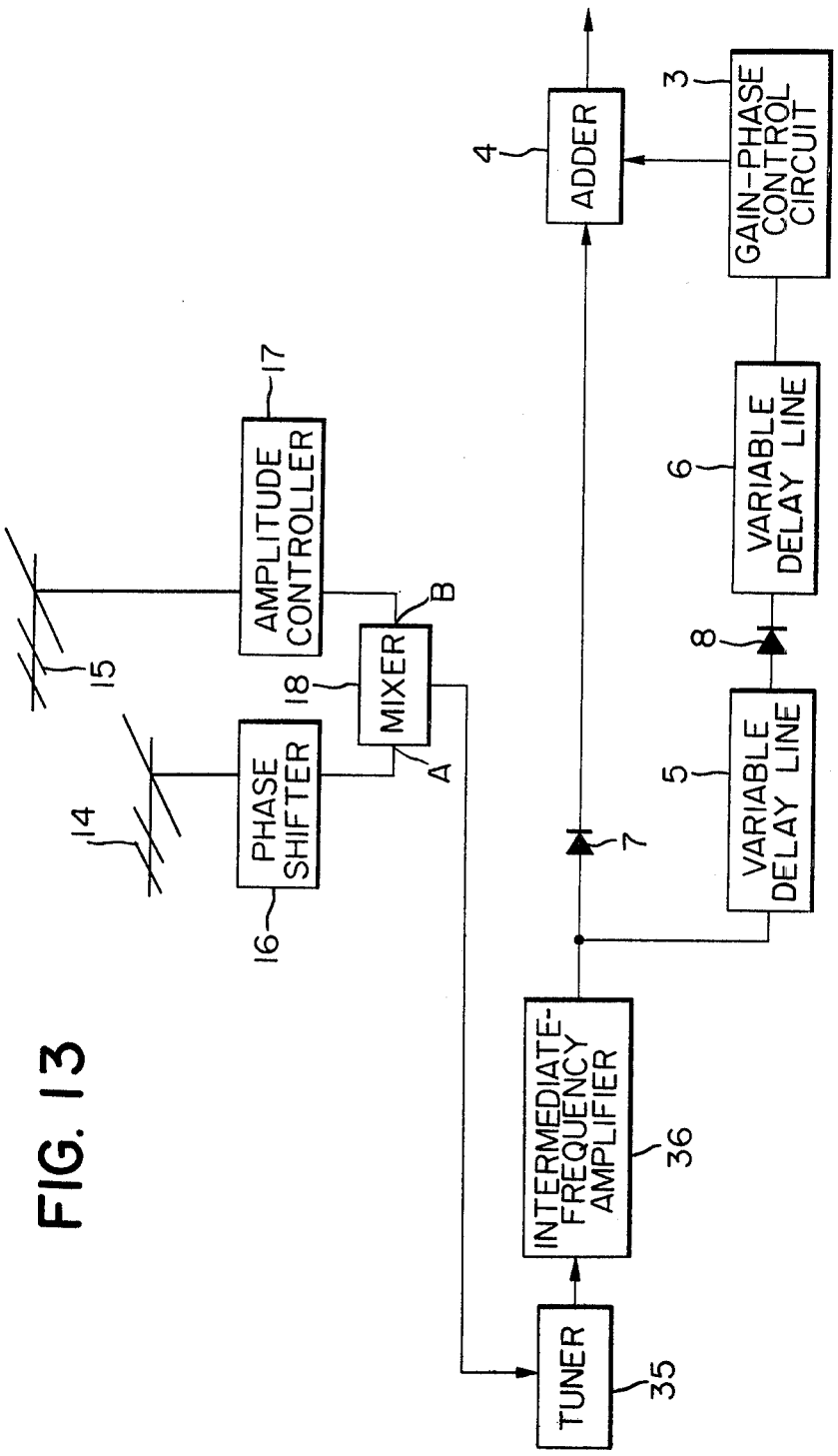
FIG. 13 is a block diagram of a fourth embodiment of the present invention.

Fourth Embodiment, FIG. 13

In FIG. 13 there is shown a block diagram of the fourth embodiment of the present invention which is the combination of the antenna system shown in FIG. 4 with the delay line cancellation system shown in FIG. 1(c). The ghost cancellation system includes a tuner 35 and an intermediate-frequency amplifier 36 in addition to the components of the system shown in FIGS. 1(c) and 4. Instead of the system shown in FIG. 1(c), any other suitable delay line cancellation systems such as shown in FIGS. 1(a) and (b) may be used. Furthermore instead of the antenna system shown in FIG. 4, either of antenna section such as shown in FIG. 8 or 10 may be used.

In summary, the present invention provides a ghost image cancellation device wherein at least two antenna bays are installed and spaced apart in the horizontal direction from each other, provided is a mixer for mixing the outputs from the antenna bays there are provided phase shifting means and amplitude control means between the antenna bays and the input terminals of the mixer so that the desired signal and the ghost signal may be in phase or out of phase by 180° with each other, and the output from the mixer is controlled both in amplitude and polarity. Since the desired signal and the ghost signal which are applied to a delay line cancellation circuit are in phase or out of phase by 180° with each other so that the ghost may be completely eliminated.

What is claimed is:

1. A ghost cancellation arrangement, comprising:

a first antenna bay for receiving a first desired signal $M_1$ and a first ghost signal $G_1$ having a different direction of arrival than the signal $M_1$;

a second antenna bay spaced from the first bay in a horizontal direction for receiving a second desired signal $M_2$ of the same frequency and arrival direction as the signal $M_1$, and a second ghost signal $G_2$ of the same frequency and arrival direction as the signal $G_1$, means for mechanically and electrically arranging said antenna bays to provide output signals therefrom corresponding to approximately a ¼ wavelength spacing therebetween;

a mixer for mixing the output signals from the first and second antenna bays;

phase shifting means between said first bay and said mixer for altering the phase of the signals $M_1$ and $G_1$;

amplitude controlling means between one of said bays and said mixer for altering the amplitudes of the corresponding output signals from said one bay; and means for adjusting said phase shifting means and said amplitude controlling means so that the mixer output signal $G_o$ corresponding to the resultant of the ghost signals $G_1$ and $G_2$ is in phase or 180° out of phase with the mixer output signal $M_o$ corresponding to the resultant of the desired signals $M_1$ and $M_2$, whereby the undesirable effects of said ghost signals are substantially eliminated.

2. A ghost cancellation device as set forth in claim 1 wherein said phase shifting means is also an attenuator for attenuating the desired signal and the ghost signal from one of said antenna bays.

3. A ghost cancellation device as set forth in claim 1 wherein said phase shifting means comprises a disk-shaped non-reversible element and a pair of strip lines disposed on said element at right angles with respect to each other, one of said strip lines being disposed between the output terminal of one of said antenna bays and one of the input terminals of said mixer, the other strip line being disposed between the output terminal of the other antenna bay and the input terminal of a 90° phase shifter, the output terminal of said 90° phase shifter being connected to the other input terminal of said mixer.

* * * * *

UNITED STATES PATENT OFFICE
CERTIFICATE OF CORRECTION

Patent No. 4,100,496          Dated  July 11, 1978

Inventor(s)  Tsuyoshi Akiyoshi, et al

It is certified that error appears in the above-identified patent and that said Letters Patent are hereby corrected as shown below:

Column 1, line 56:  "accoustic" should be --acoustic--.

Column 2, line 28:  "phost" should be --ghost--.

Column 3, line 16:  "beased" should be --based--.

line 51:  "Accoustic" should be --Acoustic--.

line 59:  "accoustic" should be --acoustic--.

Column 4, lines 5 and 17:  "accoustic" should be --acoustic--.

line 20:  "pluraltiy" should be --plurality--.

line 59:  "in" should be --is--.

UNITED STATES PATENT OFFICE
CERTIFICATE OF CORRECTION

Patent No. 4,100,496　　　　　　　　　Dated July 11, 1978

Inventor(s) Tsuyoshi Akiyoshi, et al

It is certified that error appears in the above-identified patent and that said Letters Patent are hereby corrected as shown below:

Column 4, line 64: after "The" insert --same--.

Column 6, lines 53-54: " a d " should be --and--.

line 56: "vecotr" should be --vector--.

Column 7, line 4: "shifter" should be --shifted--.

*Signed and Sealed this*

*Eighth* Day of *May 1979*

[SEAL]

Attest:

RUTH C. MASON
*Attesting Officer*

DONALD W. BANNER
*Commissioner of Patents and Trademarks*